US011788488B2

(12) United States Patent
Chilukuri et al.

(10) Patent No.: US 11,788,488 B2
(45) Date of Patent: Oct. 17, 2023

(54) FEATURED BULLNOSE RAMP FOR A THRUST REVERSER SYSTEM

(71) Applicant: Rohr, Inc., Chula Vista, CA (US)

(72) Inventors: Radhakrishna Chilukuri, San Diego, CA (US); Ashok Babu Saya, Bangalore (IN); Hussain Mahamed Javed Tapadar, Bengaluru (IN)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/405,510

(22) Filed: Aug. 18, 2021

(65) Prior Publication Data

US 2022/0112864 A1 Apr. 14, 2022

(30) Foreign Application Priority Data

Aug. 18, 2020 (IN) .............................. 202011035504

(51) Int. Cl.
*F02K 1/72* (2006.01)
*F02K 1/82* (2006.01)

(52) U.S. Cl.
CPC ................. *F02K 1/72* (2013.01); *F02K 1/82* (2013.01); *F05D 2220/323* (2013.01); *F05D 2240/14* (2013.01)

(58) Field of Classification Search
CPC .......... F02K 1/72; F02K 1/82; F05D 2240/14; F05D 2240/127; F05D 2270/17
See application file for complete search history.

(56) References Cited

U.S. PATENT DOCUMENTS

| | | | |
|---|---|---|---|
| 3,599,432 A * | 8/1971 | Ellis | ........................ F02K 1/645 60/230 |
| 3,600,894 A * | 8/1971 | McClain | ................... F02K 1/72 60/226.1 |
| 4,671,460 A | 6/1987 | Kennedy | |
| 4,894,985 A | 1/1990 | Dubois | |
| 5,347,808 A | 9/1994 | Standish | |
| 6,029,439 A | 2/2000 | Gonidec | |
| 6,151,883 A * | 11/2000 | Hatrick | ..................... F15D 1/12 239/265.29 |
| 6,402,092 B1 | 6/2002 | Jean | |
| 9,371,799 B2 | 6/2016 | Packard | |
| 9,915,226 B2 | 3/2018 | Gormley | |
| 10,184,426 B2 | 1/2019 | Schrell | |
| 10,556,672 B2 | 2/2020 | Paolini | |
| 10,590,885 B2 | 3/2020 | Acheson | |

(Continued)

OTHER PUBLICATIONS

EP search report for EP21191997.2 dated Jan. 26, 2022.

*Primary Examiner* — Andrew H Nguyen
(74) *Attorney, Agent, or Firm* — Getz Balich LLC

(57) ABSTRACT

An assembly is provided for an aircraft propulsion system. This assembly includes a forward thrust duct and a thrust reverser system. The thrust reverser system includes a thrust reverser duct, a bullnose ramp and a plurality of protrusions. The bullnose ramp is adapted to provide a transition from the forward thrust duct to the thrust reverser duct when the thrust reverser system is in a deployed configuration. The protrusions are bonded or formed integral with the bullnose ramp. Each of the protrusions is adapted to interact with boundary layer fluid flowing along the bullnose ramp from the forward thrust duct into the thrust reverser duct when the thrust reverser system is in a deployed configuration.

17 Claims, 16 Drawing Sheets

(56) References Cited

U.S. PATENT DOCUMENTS

| | | |
|---|---|---|
| 10,794,328 B2 | 10/2020 | Gormley |
| 10,837,404 B2 | 11/2020 | Aziz |
| 2014/0286768 A1* | 9/2014 | Boniface ................ F01D 5/145 |
| | | 415/208.1 |
| 2015/0308377 A1 | 10/2015 | Packard |
| 2016/0243806 A1 | 8/2016 | Frost |
| 2016/0341150 A1 | 11/2016 | Chuck |
| 2019/0136702 A1* | 5/2019 | Kuchana .................. F01D 9/02 |
| 2019/0292910 A1* | 9/2019 | Nagai ...................... F02C 7/00 |
| 2020/0003152 A1 | 1/2020 | Gormley |

\* cited by examiner

FEATURED BULLNOSE RAMP FOR A THRUST REVERSER SYSTEM

This application claims priority to IN Patent Application No. 202011035504 filed Aug. 18, 2020, which is hereby incorporated herein by reference in its entirety.

BACKGROUND

1. Technical Field

This disclosure relates generally to an aircraft propulsion system and, more particularly, to a bullnose ramp for a thrust reverser system.

2. Background Information

An aircraft propulsion system may include a thrust reverser system for redirecting an airflow from a generally aft direction to a generally forward direction during aircraft landing. Various types and configurations of thrust reverser systems are known in the art. While these known thrust reverser systems have various benefits, there is still room in the art for improvement. There is a need in the art therefore for an improved thrust reverser system which may, for example, increase thrust reverser system efficiency, reduce thrust reverser system size, reduce thrust reverser system weight, and/or reduce nacelle maximum diameter.

SUMMARY OF THE DISCLOSURE

According to an aspect of the present disclosure, an assembly is provided for an aircraft propulsion system. This aircraft propulsion system assembly includes a forward thrust duct and a thrust reverser system. The thrust reverser system includes a thrust reverser duct, a bullnose ramp and a plurality of protrusions. The bullnose ramp is adapted to provide a transition from the forward thrust duct to the thrust reverser duct when the thrust reverser system is in a deployed configuration. The protrusions are bonded or formed integral with the bullnose ramp. Each of the protrusions is adapted to interact with boundary layer fluid flowing along the bullnose ramp from an upstream portion of the forward thrust duct into the thrust reverser duct when the thrust reverser system is in a deployed configuration.

According to another aspect of the present disclosure, another assembly is provided for an aircraft propulsion system. This aircraft propulsion system assembly includes a thrust reverser system. The thrust reverser system includes a bullnose ramp and a plurality of protrusions. The bullnose ramp extends circumferentially about an axial centerline. A flow surface of the bullnose ramp flares radially outboard away from the axial centerline as the bullnose ramp extends axially along the axial centerline from an upstream end to a downstream end. The protrusions are arranged circumferentially about the axial centerline. Each of the protrusions is connected to the bullnose ramp and projects out from the flow surface. A first of the protrusions has a vertical height that varies along a longitudinal length of the first of the protrusions.

According to still another aspect of the present disclosure, another assembly is provided for an aircraft propulsion system. This aircraft propulsion system assembly includes a thrust reverser system. The thrust reverser system includes a moveable component, a bullnose ramp and a vortex generator. The bullnose ramp extends circumferentially about an axial centerline. The bullnose ramp includes a flow surface that flares radially outward away from the axial centerline as the flow surface extends axially along the axial centerline from an upstream end to a downstream end. A channel is formed by and between the bullnose ramp and an upstream edge of the moveable component when the thrust reverser system is in a stowed configuration. The vortex generator is connected to the bullnose ramp and projects out from the flow surface. The vortex generator is arranged within the channel.

At least one of the protrusions may be configured as or otherwise include a vortex generator.

At least one of the protrusions may project out from the bullnose ramp into an inlet to the thrust reverser duct.

The protrusions may include a first protrusion and a second protrusion. A chord line of the first protrusion may be parallel with a chord line of the second protrusion.

The protrusions may include a first protrusion and a second protrusion. A chord line of the first protrusion may be angularly offset from a chord line of the second protrusion.

At least one of the protrusions may have a planar geometry.

At least one of the protrusions may have a non-planar geometry.

The protrusions may include a first protrusion that extends longitudinally from an upstream end to a downstream end. A height of the first protrusion at the upstream end may be different than the height of the first protrusion at the downstream end.

The protrusions may include a first protrusion that extends longitudinally from an upstream end to a downstream end. A height of the first protrusion at the upstream end may be equal to the height of the first protrusion at the downstream end.

The bullnose ramp may extend circumferentially about an axial centerline. The protrusions may include a first protrusion and a second protrusion. The first protrusion may be axially aligned with the second protrusion.

The bullnose ramp may extend circumferentially about an axial centerline. The protrusions may include a first protrusion and a second protrusion. The first protrusion may be axially offset from the second protrusion.

A size of the first protrusion may be different than or equal to a size of the second protrusion.

The bullnose ramp may form an upstream boundary of an inlet to the thrust reverser duct when the thrust reverser system is in a deployed configuration.

The bullnose ramp may extend circumferentially about an axial centerline. The bullnose ramp may have a surface with an arcuate sectional geometry when viewed in a plane parallel with the axial centerline.

The aircraft propulsion system may be configured as or otherwise include a turbofan aircraft propulsion system. The forward thrust duct may be configured as or otherwise include a bypass duct.

The thrust reverser system may also include a moveable component. A channel may be formed by and between the bullnose ramp and an upstream edge of the moveable component when the thrust reverser system is in a stowed configuration. At least one of the protrusions may be arranged within the channel.

The thrust reverser system may also include a moveable component. The moveable component may axially abut the bullnose ramp when the thrust reverser system is in a stowed configuration. At least one of the protrusions may be axially overlapped by and/or may be radially outboard of the moveable component when the thrust reverser system is in a stowed configuration.

The thrust reverser system may also include a cascade with a plurality of flow channels. A first of the protrusions may be circumferentially aligned with a first of the flow channels. A second of the protrusions may be circumferentially aligned with a second of the flow channels. The second of the protrusions may be circumferentially adjacent the first of the protrusions.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
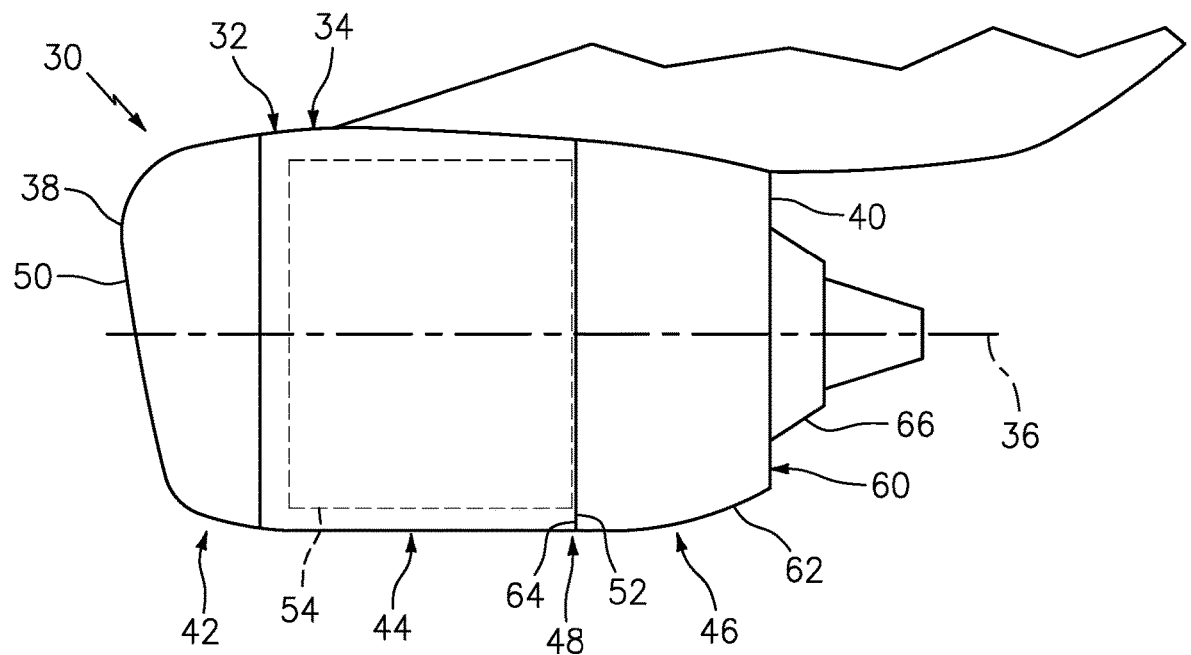
FIG. 1 is a side illustration of an aircraft propulsion system with its thrust reverser system in a stowed configuration.

FIG. 1 illustrates an aircraft propulsion system 30 for an aircraft such as, but not limited to, a commercial airliner or a cargo plane. The propulsion system 30 includes a nacelle 32 and a gas turbine engine. This gas turbine engine may be configured as a high-bypass turbofan engine. Alternatively, the gas turbine engine may be configured as any other type of gas turbine engine capable of propelling the aircraft during flight.

The nacelle 32 is configured to house and provide an aerodynamic cover for the gas turbine engine. An outer structure 34 of the nacelle 32 extends axially along an axial centerline 36 (e.g., a centerline of the propulsion system 30, the nacelle 32 and/or the gas turbine engine) between a nacelle forward end 38 and a nacelle aft end 40. The nacelle outer structure 34 of FIG. 1 includes a nacelle inlet structure 42, one or more fan cowls 44 (one such cowl visible in FIG. 1) and a nacelle aft structure 46, which is configured as part of or includes a thrust reverser system 48 (see also FIG. 2).

The inlet structure 42 is disposed at the nacelle forward end 38. The inlet structure 42 is configured to direct a stream of air through an inlet opening 50 at the nacelle forward end 38 and into a fan section of the gas turbine engine.

The fan cowls 44 are disposed axially between the inlet structure 42 and the aft structure 46. Each fan cowl 44 of FIG. 1, in particular, is disposed at (e.g., on, adjacent or proximate) an aft end 52 of a stationary portion of the nacelle 32, and extends forward to the inlet structure 42. Each fan cowl 44 is generally axially aligned with the fan section of the gas turbine engine. The fan cowls 44 are configured to provide an aerodynamic covering for a fan case 54.

Figure 3:
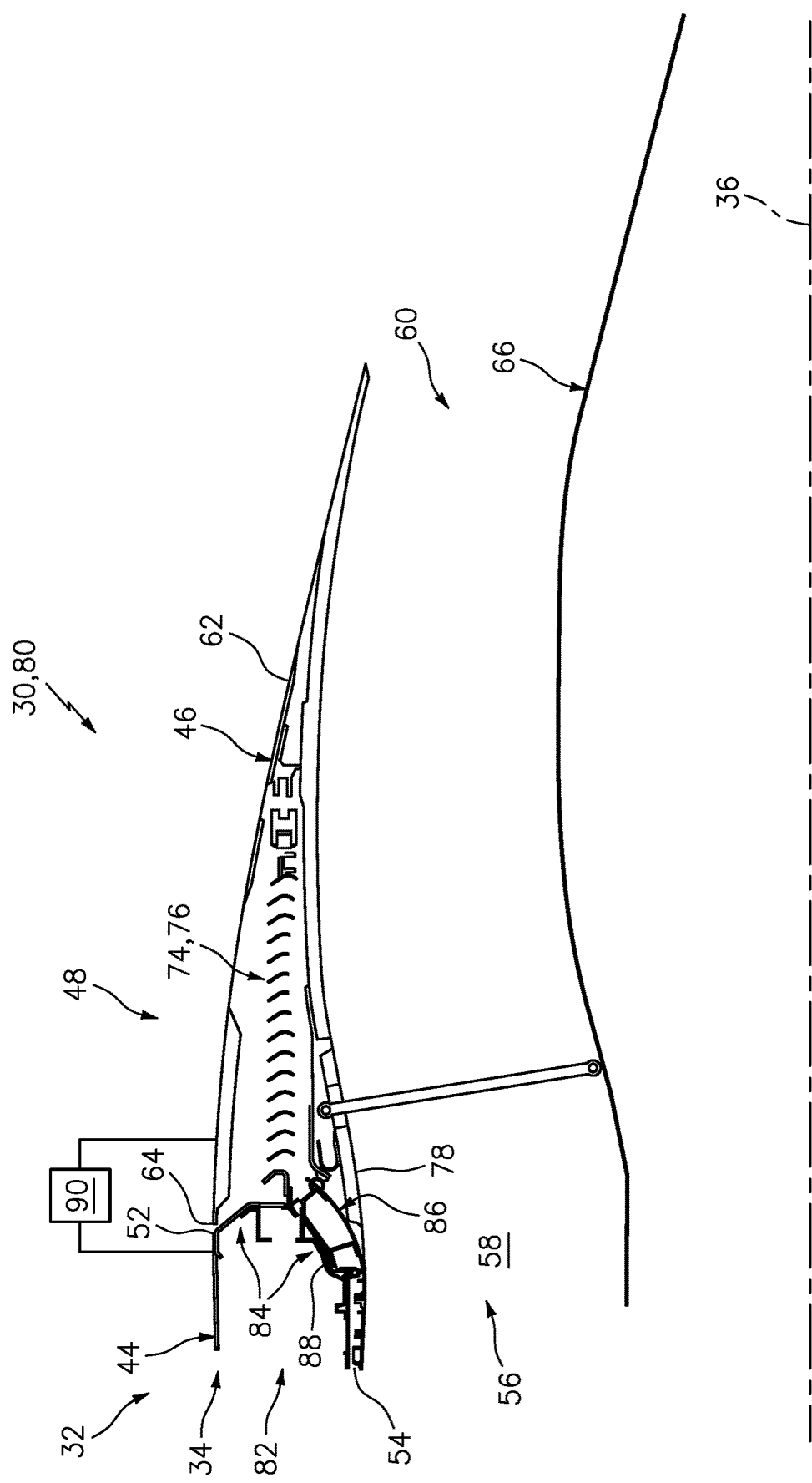
FIG. 3 is a side sectional illustration of a portion of the aircraft propulsion system with its thrust reverser system in the stowed configuration.

Briefly, the fan case 54 extends circumferentially around the axial centerline 36 and thereby circumscribes the fan section. Referring to FIG. 3, the fan case 54 along with the nacelle 32 form a forward outer peripheral boundary of a forward thrust duct 56 of the propulsion system 30. In the embodiment of FIG. 3, the forward thrust duct 56 is configured as a bypass duct. The forward thrust duct 56 of FIG. 3, for example, at least partially or completely forms a bypass flowpath 58 within the propulsion system 30, which bypass flowpath 58 bypasses (e.g., flows around and/or outside of, not through) a core of the gas turbine engine to a bypass nozzle 60. Thus, during nominal propulsion system operation (e.g., when the thrust reverser system 48 is in its stowed configuration; see FIG. 3), the forward thrust duct 56 is configured to facilitate forward thrust for the propulsion system 30; e.g., direct fluid (e.g., fan/compressed air) out of the propulsion system 30 through the bypass nozzle 60 in an axially aft direction.

Referring again to FIG. 1, the term "stationary portion" is used above to describe a portion of the nacelle 32 that is stationary during propulsion system operation; e.g., during takeoff, aircraft flight and landing. However, the stationary portion may be otherwise movable for propulsion system inspection/maintenance; e.g., when the propulsion system 30 is non-operational. Each of the fan cowls 44, for example, may be configured to provide access to components of the gas turbine engine such as the fan case 54 and/or peripheral equipment configured therewith for inspection, maintenance and/or otherwise. In particular, each of fan cowls 44 may be pivotally mounted with the aircraft propulsion system 30 by, for example, a pivoting hinge system. The present disclosure, however, is not limited to the foregoing fan cowl configuration and/or access scheme.

The aft structure 46 includes a translating sleeve 62 for the thrust reverser system 48. The translating sleeve 62 of FIG. 1 is disposed at the nacelle aft end 40. This translating sleeve 62 extends axially along the axial centerline 36 between a forward end 64 thereof and the nacelle aft end 40. The translating sleeve 62 is configured to partially form an aft outer peripheral boundary of the forward thrust duct 56 and its flowpath 58 (see FIG. 3). The translating sleeve 62 may also be configured to form the bypass nozzle 60 for the bypass flowpath 58 with an inner structure 66 of the nacelle 32 (e.g., an inner fixed structure (IFS)), which nacelle inner structure 66 houses the core of the gas turbine engine. Briefly, the turbine engine core typically includes a compressor section, a combustor section and a turbine section of the gas turbine engine.

The translating sleeve 62 of FIG. 1 includes a pair of sleeve segments (e.g., halves) arranged on opposing sides of the propulsion system 30 (one such sleeve segment visible in FIG. 1). The present disclosure, however, is not limited to such an exemplary translating sleeve configuration. For example, the translating sleeve 62 may alternatively have a substantially tubular body. For example, the translating sleeve 62 may extend more than three-hundred and thirty degrees (330°) around the axial centerline 36.

Figure 2:
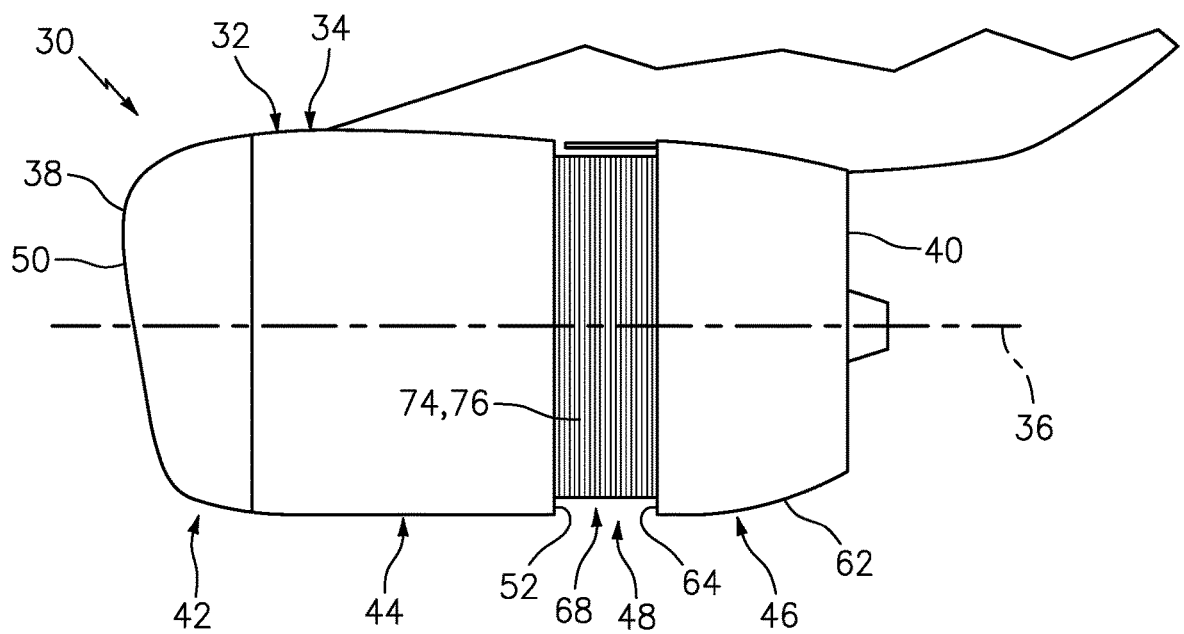
FIG. 2 is a side illustration of the aircraft propulsion system with its thrust reverser system in a deployed configuration.

Referring to FIGS. 1 and 2, the translating sleeve 62 is an axially translatable structure. Each translating sleeve segment, for example, may be slidably connected to one or more stationary structures (e.g., a pylon and a lower bifurcation) through one or more respective track assemblies. Each track assembly may include a rail with a track beam; however, the present disclosure is not limited to the foregoing exemplary sliding connection configuration.

With the foregoing configuration, the translating sleeve 62 may translate axially along the axial centerline 36 and relative to the stationary portion. The translating sleeve 62 may thereby move axially between a forward stowed position (see FIGS. 1 and 3) where the thrust reverser system 48 is in the stowed configuration and an aft deployed position (see FIGS. 2 and 4) where the thrust reverser system 48 is in a deployed configuration. In the forward stowed position of FIG. 3, the translating sleeve 62 provides the functionality described above. In the aft deployed position of FIG. 4, the translating sleeve 62 opens one or more thrust reverser ducts 68 (one visible in the figures), where each thrust reverser duct 68 extends radially through the nacelle outer structure 34 from a thrust reverser duct inlet 70 to a thrust reverser duct outlet 72. The thrust reverser duct inlet 70 is located radially adjacent the forward thrust duct 56 and fluidly couples the respective thrust reverser duct 68 with the forward thrust duct 56 when the thrust reverser system 48 is in its deployed configuration. In the aft deployed position of FIG. 4, the translating sleeve 62 may also uncover one or more additional components of the thrust reverser system 48. The translating sleeve 62 of FIG. 4, for example, also uncovers a cascade structure 74, which cascade structure 74 may include one or more cascade segments 76 (e.g., cascade halves) (one visible in FIGS. 2 and 4). In addition, as the translating sleeve 62 moves from the stowed position to the deployed position, one or more blocker doors 78 (see FIGS. 3 and 4) arranged with the translating sleeve 62 may be deployed to divert the fluid (e.g., fan/compressed air) from the forward thrust duct 56 and its flowpath 58 into the one or more thrust reverser ducts 68 and through the cascade structure 74 to provide reverse thrust for the propulsion system 30; e.g., direct the fluid out of the propulsion system 30 through the thrust reverser duct outlet 72 generally in an axially forward direction and/or a radially outward direction.

Figure 4:
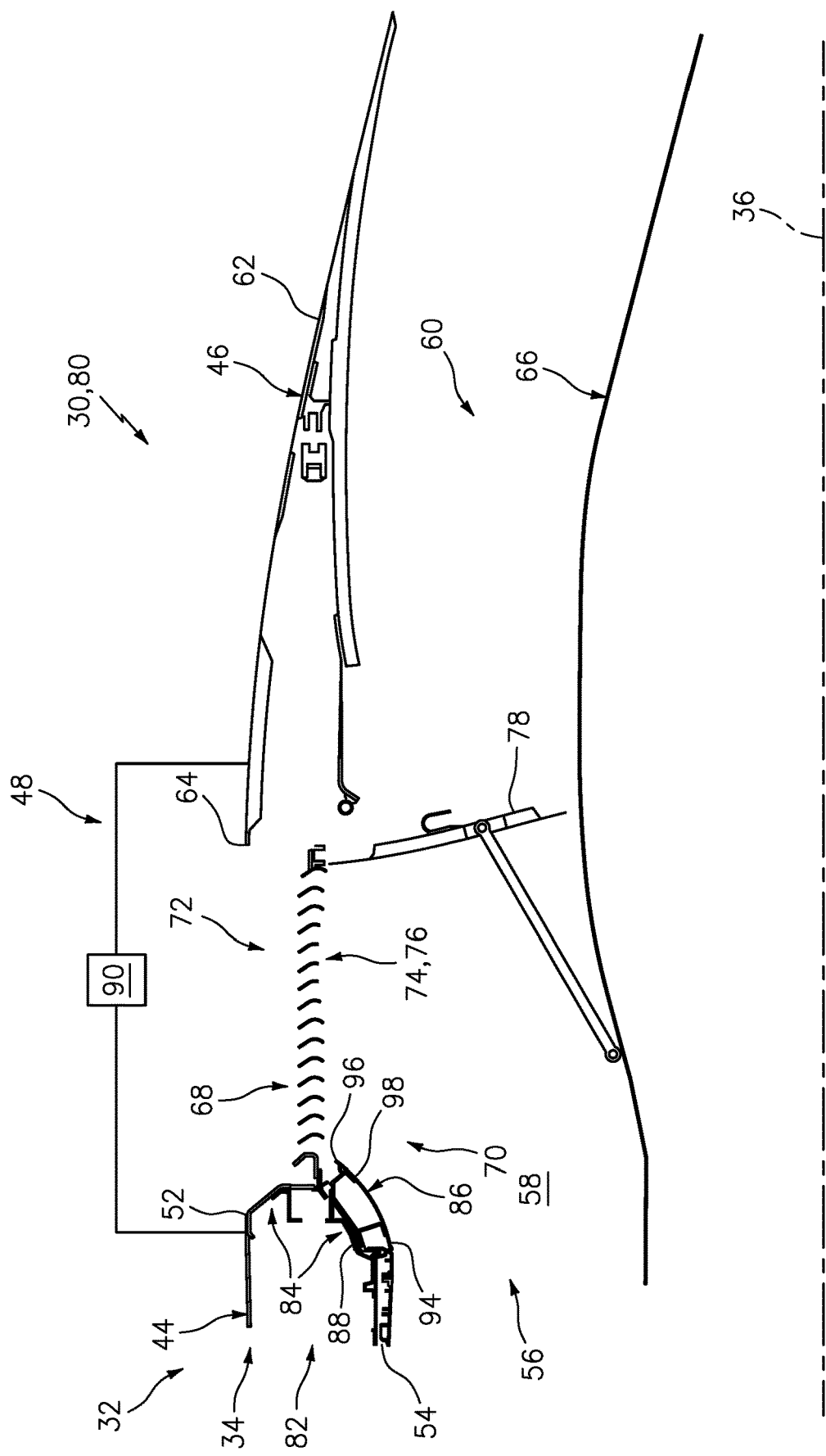
FIG. 4 is a side sectional illustration of a portion of the aircraft propulsion system with its thrust reverser system in the deployed configuration.

FIG. 3 is a partial side sectional illustration of an assembly 80 for the propulsion system 30 with the thrust reverser system 48 in its stowed configuration. FIG. 4 is a partial side sectional illustration of the propulsion system assembly 80 with the thrust reverser system 48 in its deployed configuration. The propulsion system assembly 80 of FIGS. 3 and 4 includes the fan case 54, a nacelle fixed structure 82, the cascade structure 74, the blocker doors 78 and the translating sleeve 62.

The fixed structure 82 circumscribes and axially overlaps the fan case 54. The fixed structure 82 includes the fan cowls 44, one or more internal support structures 84 (one visible in FIGS. 3 and 4) and one or more inlet bullnose ramps 86 (e.g., a fan ramp fairing) for the thrust reverser system 48 (one visible in FIGS. 3 and 4).

The support structures 84 are arranged circumferentially about the axial centerline 36. One of the support structures 84, for example, may be arranged on one side of the propulsion system 30 and another one of the support structures 84 may be arranged on the other opposing side of the propulsion system 30. Each support structure 84 may provide a radial support (e.g., a landing) for a respective one of the fan cowls 44. Each support structure 84 may also or alternatively provide support for one or more components of the thrust reverser system 48 such as, but not limited to, a respective one of the cascade segments 76 of the cascade structure 74 and/or a respective one of the bullnose ramps 86. Of course, in other embodiments, the support structures 84 may be combined into a single generally annular support structure.

Each support structure 84 of FIGS. 3 and 4 may be configured as or otherwise include a structural beam 88; e.g., a torque box. The structural beam 88 provides a base structure to which a respective one of the cascade segments 76 of the cascade structure 74 and/or a respective one of the bullnose ramps 86 may be mounted. The structural beam 88 also provides a base structure to which one or more actuators 90 (e.g., hydraulic/pneumatic actuators, or electric motors, etc.) may be mounted. Briefly, the actuators 90 (one schematically shown in FIGS. 3 and 4) are arranged circumferentially about the axial centerline 36. These actuators 90 are configured to move (e.g., axially translate) the translating sleeve 62 axially along the axial centerline 36 relative to the fixed structure 82 between the stowed position of FIG. 3 and the deployed position of FIG. 4.

The bullnose ramps 86 are arranged circumferentially about the axial centerline 36. One of the bullnose ramps 86, for example, may be arranged on one side of the propulsion system 30 and another one of the bullnose ramps 86 may be arranged on the other opposing side of the propulsion system 30. More particularly, each of the bullnose ramps 86 is aligned with and partially forms the inlet 70 into a respective one of the thrust reverser ducts 68. Each bullnose ramp 86 of FIG. 4, for example, is configured to form an upstream boundary (e.g., upstream axial peripheral side) of the respective thrust reverser duct inlet 70. Each bullnose ramp 86 of FIG. 4 is thereby also configured to provide a (e.g., smooth and/or aerodynamic) transition from the forward thrust duct 56 to the respective thrust reverser duct 68 when the thrust reverser system 48 is in its deployed configuration.

Figure 5:
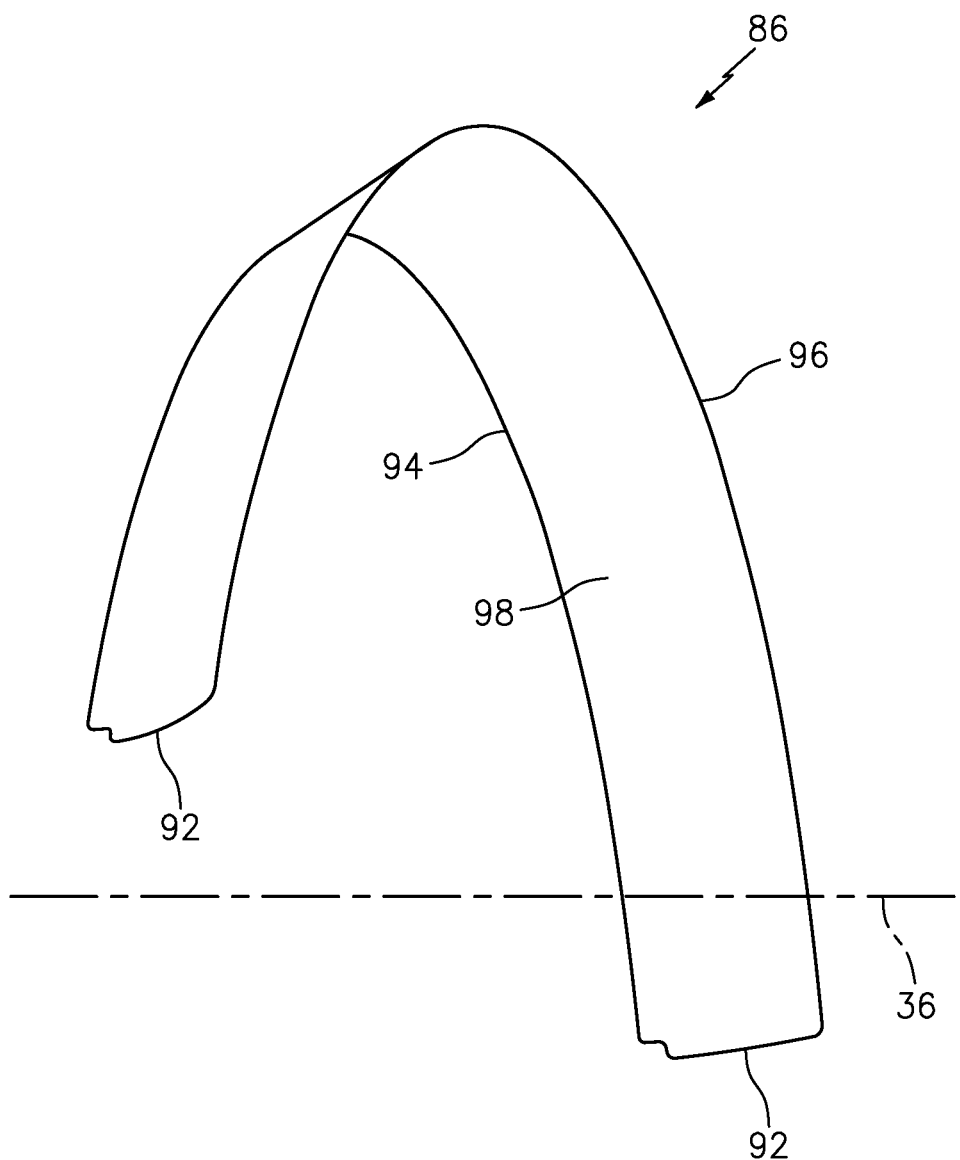
FIG. 5 is a perspective illustration of a bullnose ramp.

Each bullnose ramp 86 of FIG. 5 extends circumferentially about the axial centerline 36 between and to opposing circumferential ends 92. Each bullnose ramp 86 extends axially along the axial centerline 36 between and to a bullnose ramp first (e.g., upstream) side 94 and/or edge and a bullnose ramp second (e.g., downstream) side 96 and/or edge. Each bullnose ramp 86 includes a bullnose ramp surface 98 (e.g., a transition surface) at a radial inner side of the respective bullnose ramp 86. This bullnose ramp surface 98 is configured to provide a smooth aerodynamic transition from the forward thrust duct 56 to the respective thrust reverser duct 68. The bullnose ramp surface 98 of FIG. 5 is thereby configured with an eased, ramped and/or otherwise flared sectional geometry. The bullnose ramp surface 98 of FIG. 5, for example, is configured with curved (e.g., arcuate) and/or splined sectional geometry when viewed, for example, in a plane parallel and/or coincident with the axial centerline 36; e.g., plane of FIG. 4.

Figure 6:
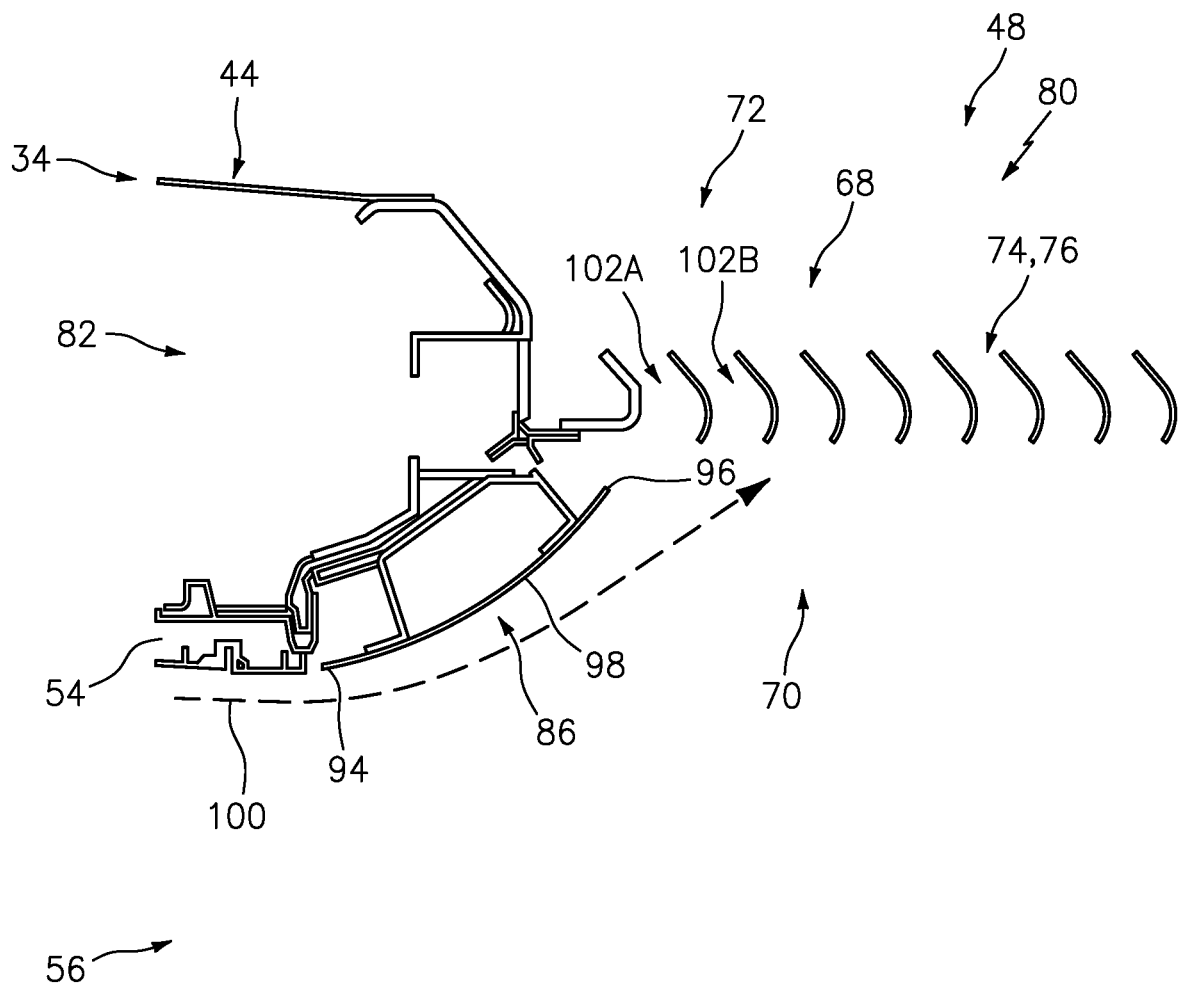
FIG. 6 is a side section illustration of boundary layer fluid separating from the bullnose ramp during thrust reverser system operation.
Figure 6:
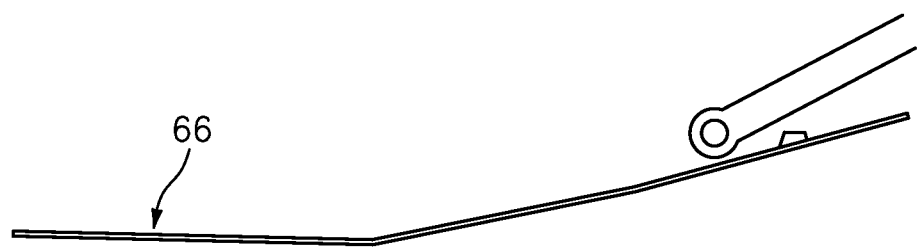

Referring to FIG. 6, when the thrust reverser system 48 is in its deployed configuration (e.g., the blocker doors 78 and the translating sleeve 62 are deployed as shown in FIG. 4), fluid (e.g., fan and/or compressed air) may be directed out of the forward thrust duct 56 and into each thrust reverser duct 68. Under certain conditions and/or with certain bullnose ramp surface geometries, boundary layer fluid 100 flowing along each bullnose ramp surface 98 may separate from the respective bullnose ramp 86. As a result, very little fluid may flow into and through forward flow channels 102A and 102B in the respective cascade structure segment 76.

Figure 7:
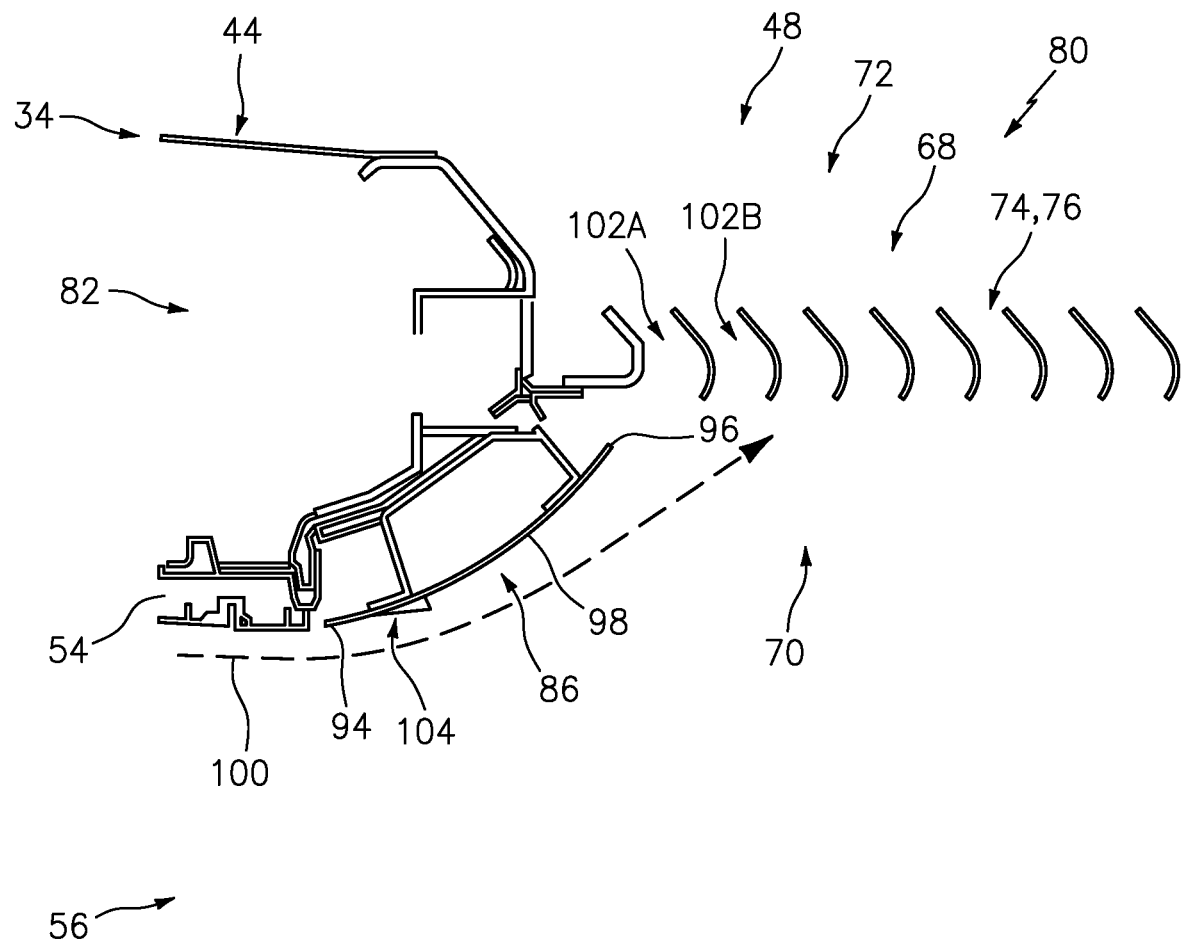
FIG. 7 is a side section illustration of the boundary layer fluid flowing along the bullnose ramp during thrust reverser system operation resulting from inclusion of one or more protrusions; e.g., vortex generators.
Figure 7:
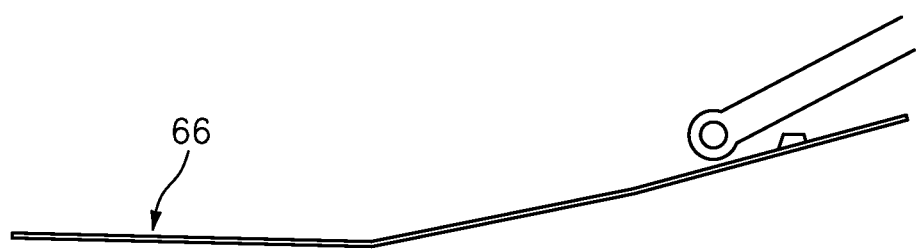

To increase fluid flow into the forward flow channels 102A and 102B, the thrust reverser system 48 may be configured with one or more protrusions 104 (e.g., projections, vortex generators, etc.) as shown in FIG. 7. Each of these protrusions 104 is connected to (e.g., formed integral with, or mechanically fastened, bonded and/or otherwise attached to) a respective one of the bullnose ramps 86. Each of the protrusions 104 further projects out from the respective bullnose ramp surface 98 into the respective thrust reverser duct inlet 70 (or more generally into the duct 68) for interacting with the boundary layer fluid 100 flowing along the respective bullnose ramp 86. This interaction may cause longitudinal vortices (see also FIG. 19B) to form in the boundary layer fluid 100 and cause the boundary layer fluid 100 to continue generally along the respective bullnose ramp surface 98 and into the forward flow channels 102A and 102B. More particularly, the protrusions 104 may aid in a mixing process within fluid layers in the boundary layer region as well as increase momentum of the low velocity flow near the bullnose ramp surface 98 to resist shear forces. The inclusion of the protrusions 104 may thereby increase efficiency of a forward portion of the thrust reverser system 48. Consequently, an axial length of the thrust reverser system 48 and its components may be shortened, which may facilitate more compact thrust reverser packaging and/or reduction in thrust reverser system weight.

Figure 8:
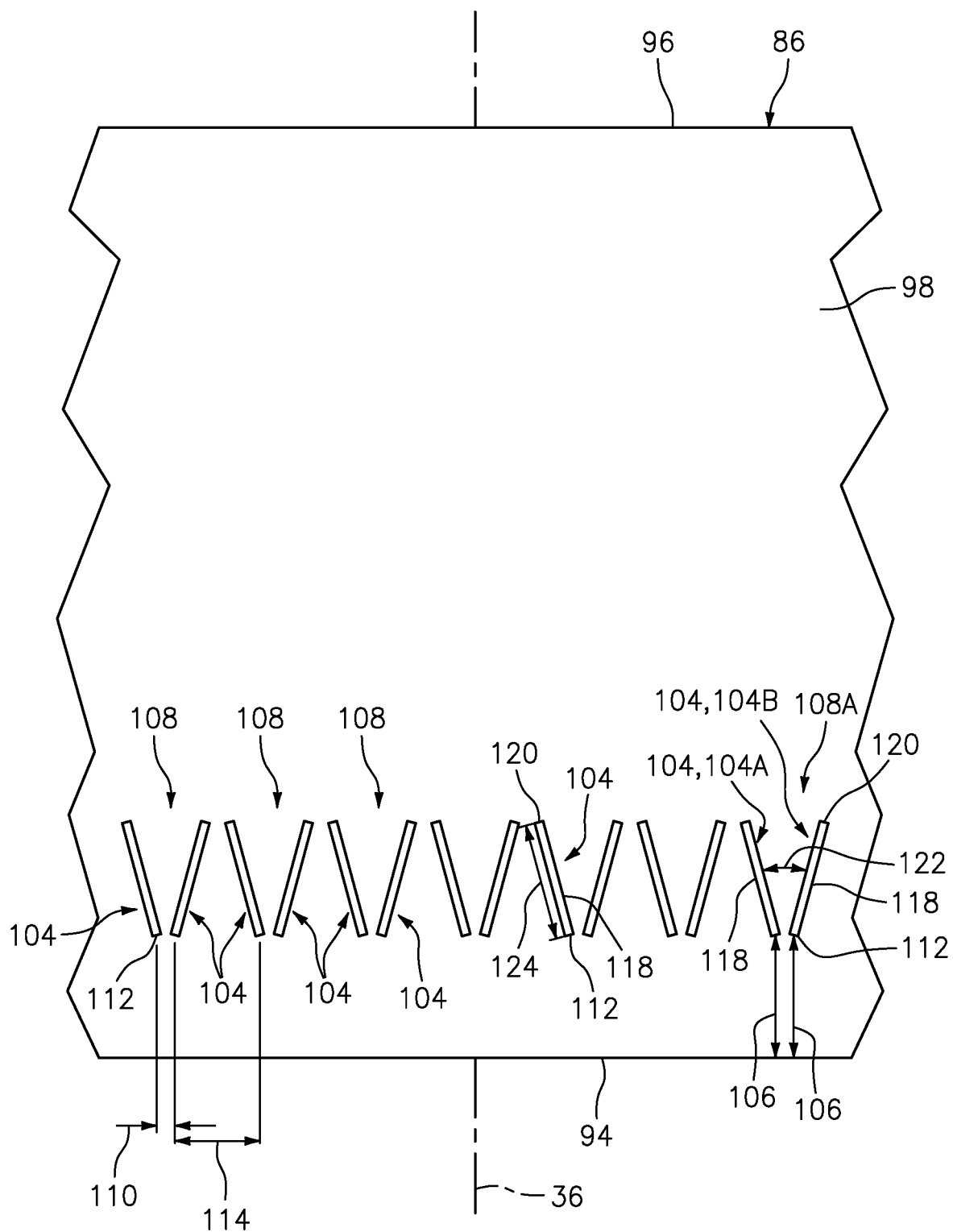
FIGS. 8, 8B and 9 are plan view illustrations of a portion of the bullnose ramp configured with various arrangements of protrusions.

Referring to FIG. 8, the protrusions 104 are arranged circumferentially about the axial centerline 36 in a (e.g., arcuate) array. Each of the protrusions 104 may be axially aligned with one or more or each of the other protrusions 104 such that, for example, each protrusion 104 is located at a common longitudinal distance 106 from the bullnose ramp first side 94.

Figure 8B:
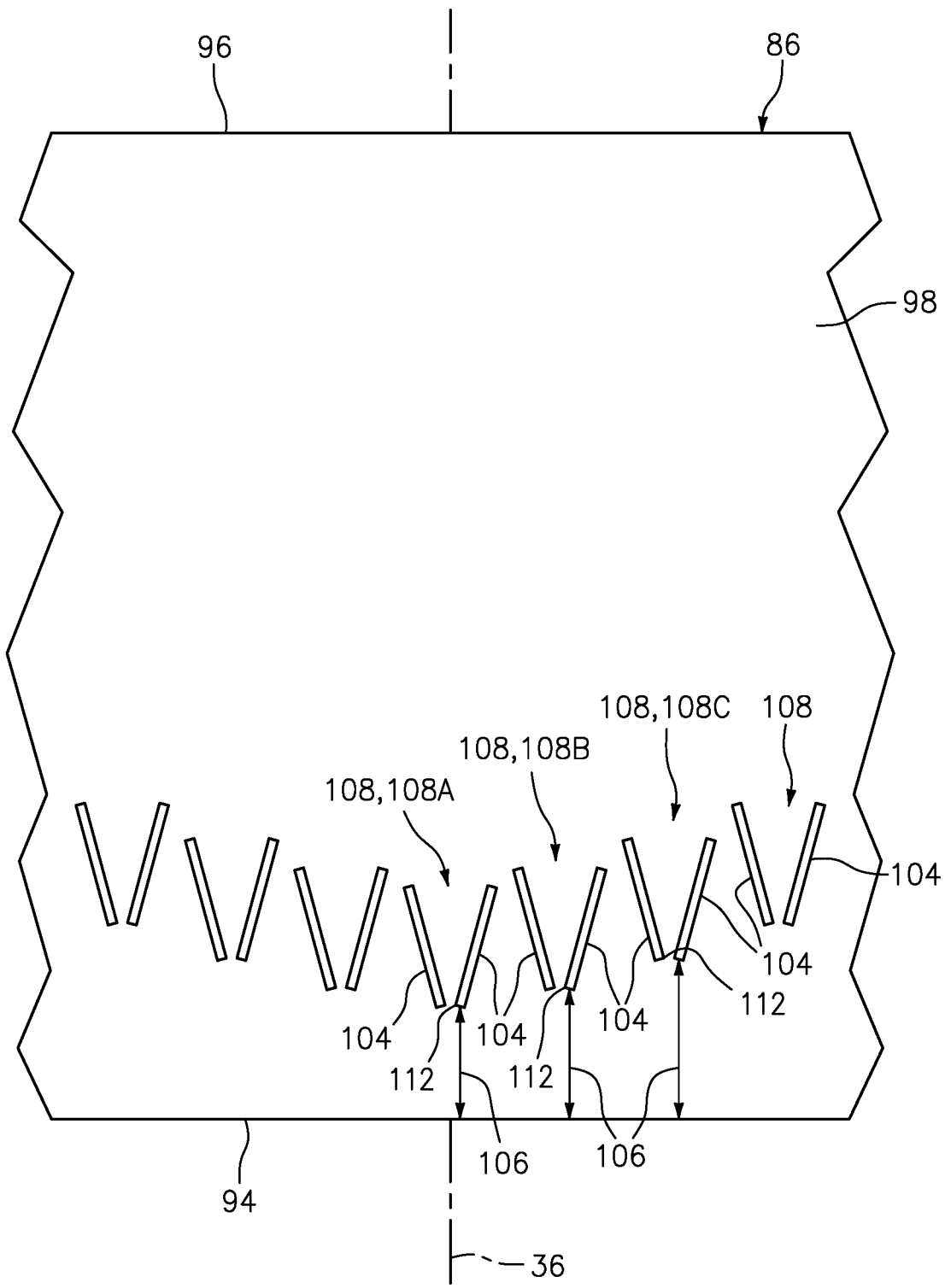

The protrusions 104 may be arranged into one or more sets 108 (e.g., pairs). Laterally neighboring (e.g., adjacent) protrusions 104 in each set 108 are separated by a lateral (e.g., circumferential) intraset distance 110 at, for example, their upstream ends 112. Laterally neighboring (e.g., adjacent) protrusions 104 in laterally neighboring (e.g., adjacent) sets are separated by a lateral (e.g., circumferential) interest distance 114 at, for example, their upstream ends 112. This lateral interest distance 114 may be different (e.g., greater or less) than the intraset distance 110 as shown, for example, in FIG. 8. The present disclosure, however, is not limited to such a dimensional relationship between the protrusions 104. For example, referring to FIG. 9, each laterally neighboring (e.g., adjacent) pair of protrusions 104 may be separated by a common lateral (e.g., circumferential) distance 116. In another example, one or some of the sets 108 may be axially offset from one or more other sets 180 as shown, for example, in FIG. 8B. More particularly, the longitudinal distance 106 associated with one or some of the sets 108 (e.g., 108A) may be different (e.g., less) than the longitudinal distance 106 associated with one or more other sets 180 (e.g., 108B, 108C). In the specific embodiment of FIG. 8B, circumferentially adjacent sets 108 may axially overlap one another, and the upstream ends 112 (e.g., leading edges) of some or all of the sets 108 are arranged along, for example, a (e.g., smooth, gradual) curve or otherwise sloped line.

Figure 9:
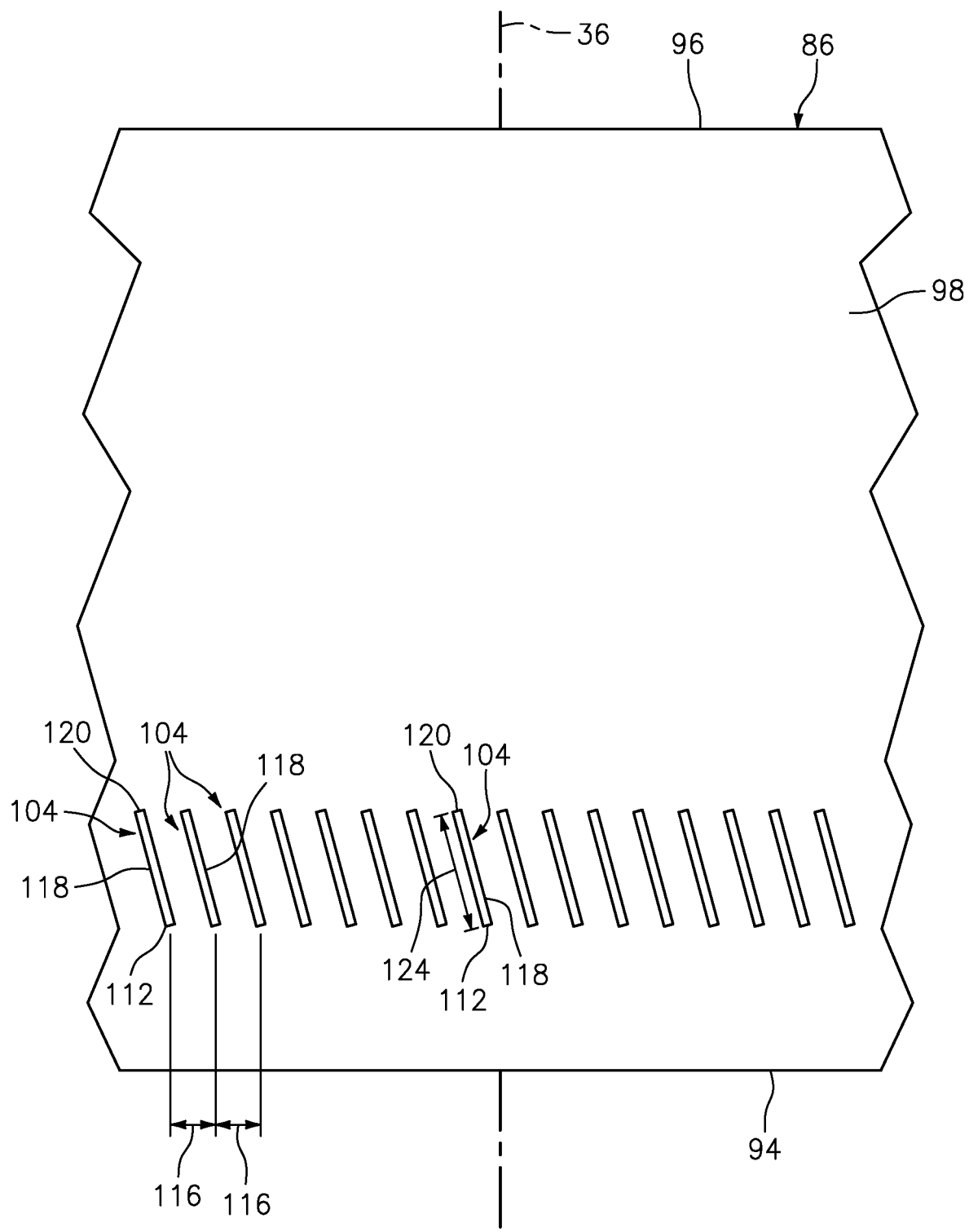

Referring to FIGS. 8 and 9, each protrusion 104 extends longitudinally along a respective protrusion chord line 118 from its upstream end 112 to a downstream end 120. Referring to FIG. 8, the chord lines 118 of some (e.g., laterally every other) of the protrusions 104 may be parallel with one another, but angularly offset from other of the protrusions 104. For example, the first protrusion (e.g., 104A) in a set (e.g., 108A) may be angularly offset from a second protrusion (e.g., 104B) in that set (e.g., 108A) by an included angle 122; e.g., an acute angle such as, but not limited to, an angle between ten and forty degrees (10-40°) and, more particularly, between twenty and thirty degrees (20-30°). In other embodiments, however, the chord lines 118 of all of the protrusions 104 may be parallel with one another as shown, for example, in FIG. 9.

Each of the protrusions 104 has a longitudinal length 124 measured along its chord line 118 and between the protrusion ends 112 and 120. The protrusions 104 may be sized with common longitudinal lengths 124; i.e., the same longitudinal lengths. Alternatively, the longitudinal length 124 of one or more of the protrusions 104 (e.g., upstream protrusions 104U) may be different (e.g., smaller or greater) than the longitudinal length of one or more others of the protrusions 104 (e.g., downstream protrusions 104D) as shown, for example, in FIG. 10. In addition or alternatively, a vertical height 126 of one or more of the protrusions 104 (e.g., the upstream protrusions 104U) may be different (e.g., smaller or greater) than the vertical height 126 of one or more others of the protrusions 104 (e.g., the downstream protrusions 104D), where the vertical height 126 of each protrusion 104 may be measured as a perpendicular distance from the bullnose ramp surface 98 to a vertical distal end of the respective protrusion 104. The present disclosure, however, is not limited to such a dimensional relationship between the protrusions 104. For example, in other embodiments, each of the protrusions 104 may have a common vertical height 126.

The vertical height 126 of each protrusion 104 at its distal end is selected to be equal to or greater than a vertical thickness of the boundary layer flow. Thus, where the boundary layer flow is relatively thin (e.g., proximate or towards the first side 94 of the bullnose ramp 86), the vertical heights 126 of the protrusions 104U may be sized relatively small. However, where the boundary layer flow is relatively thick (e.g., proximate or towards the second side 96 of the bullnose ramp 86), the vertical heights 126 of the protrusions 104D may be sized relatively large. The present disclosure, however, is not limited to such a dimensional relationship.

Figure 11:
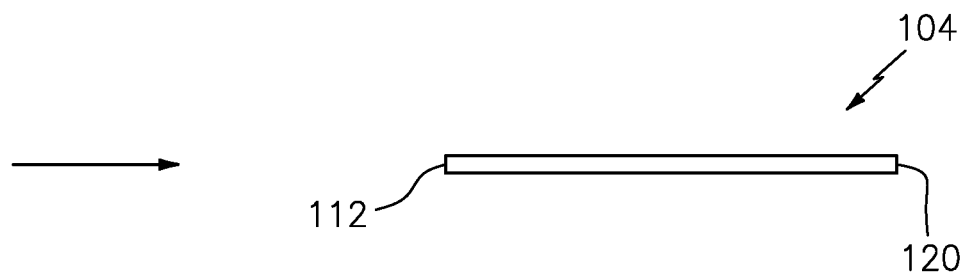
FIG. 11 is a plan view illustration of a protrusion with a generally planar geometry.

In some embodiments, referring to FIG. 11, one or more or each of the protrusions 104 may be configured with a planar geometry. Each protrusion 104, for example, may be configured as a flat, generally two-dimensional fin.

Figure 12:
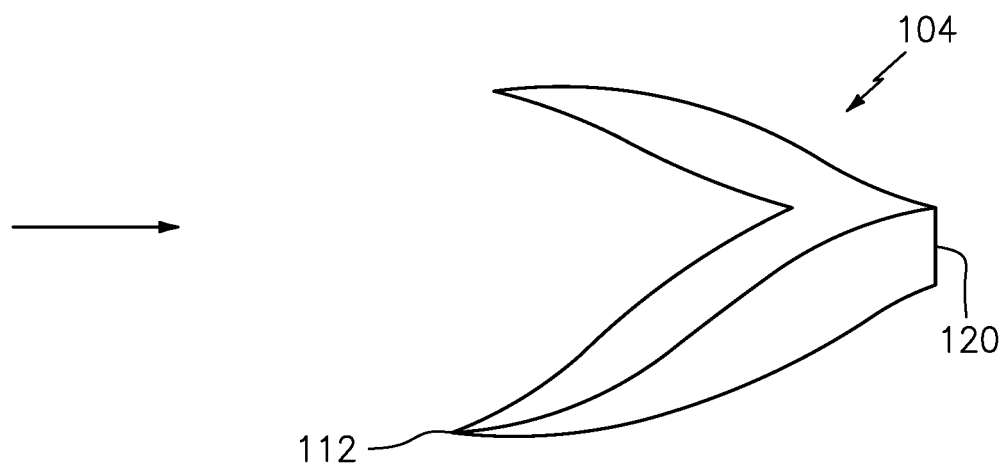
FIGS. 12 and 13 are perspective illustrations of protrusions with non-planar geometries.
Figure 13:
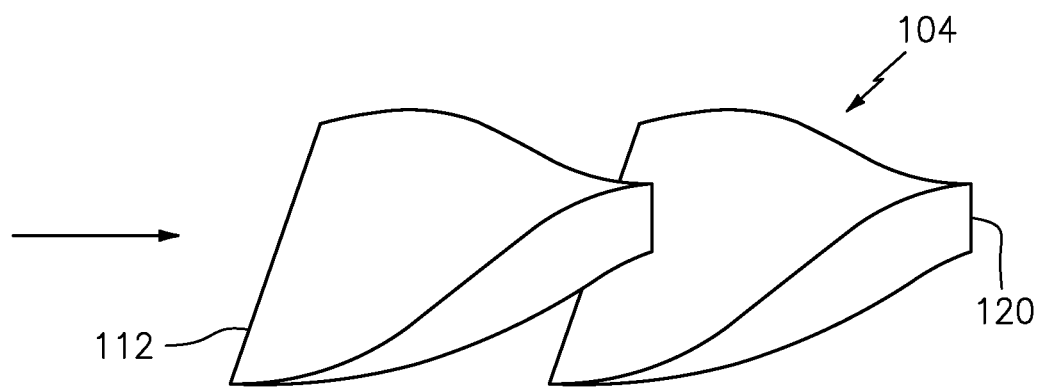

In some embodiments, referring to FIGS. 12 and 13, one or more or each of the protrusions 104 may be configured with a non-planar geometry. Each protrusion 104 of FIG. 12, for example, is configured with a three-dimensional wishbone or chevron shaped geometry. In another example, each protrusion 104 of FIG. 13 is configured with a three-dimensional doublet shaped geometry. Of course, one or more of the protrusions 104 may be configured with various other 2D and/or 3D geometries, and the present disclosure is not limited to any thereof.

Figure 14:
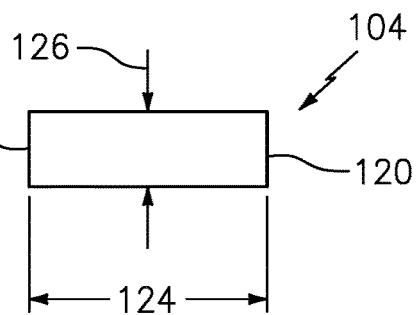
FIG. 14 is a side illustration of a protrusion with a uniform vertical height along its longitudinal length.
Figure 15:
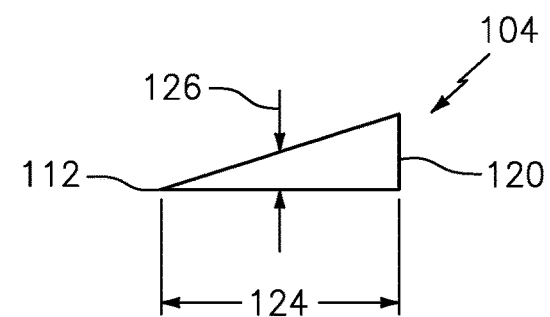
FIGS. 15-18 are side illustrations of various protrusions with non-uniform vertical heights along at least a portion of their longitudinal lengths.
Figure 16:
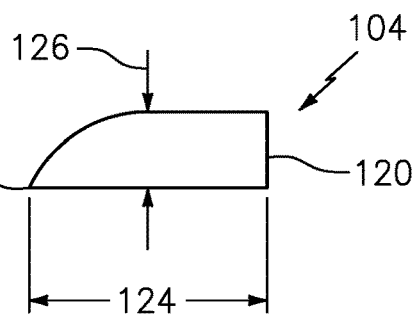
Figure 17:
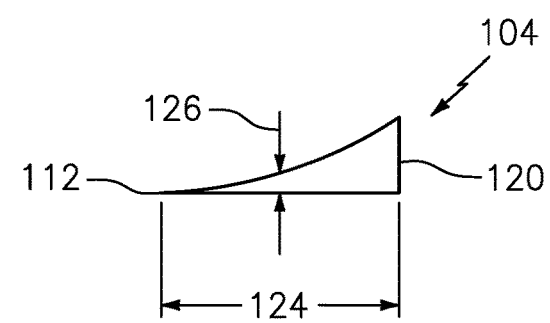
Figure 18:
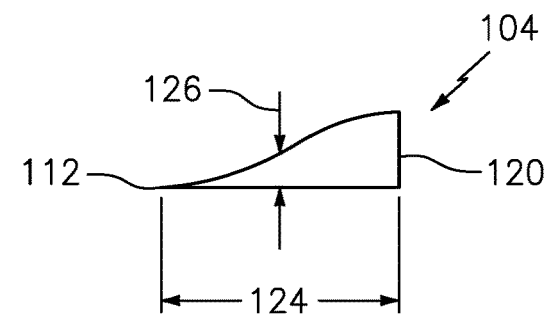

In some embodiments, referring to FIG. 14, the vertical height 126 of one or more or each of the protrusions 104 may be uniform along its longitudinal length 124. For example, the vertical height 126 of the protrusion 104 of FIG. 14 at its upstream end 112 is equal to the vertical height 126 at its downstream end 120.

In some embodiments, referring to FIGS. 15-18, the vertical height 126 of one or more or each of the protrusions 104 may be non-uniform along its longitudinal length 124. For example, the vertical height 126 of the protrusion 104 of FIGS. 15-18 at its upstream end 112 is different (e.g., less) than the vertical height 126 at its downstream end 120. More particularly, the vertical heights 126 may be tailored such that the respective protrusion 104 has a generally wedge shaped/tapered side geometry; e.g., a triangular shaped side geometry in FIG. 15; an at least partially or completely convex (e.g., gothic) shaped side geometry in FIG. 16; an at least partially or completely concave (e.g., parabolic) shaped side geometry in FIG. 17; and at least partially or completely concave and convex (e.g., ogive) shaped side geometry in FIG. 18.

Figure 10:
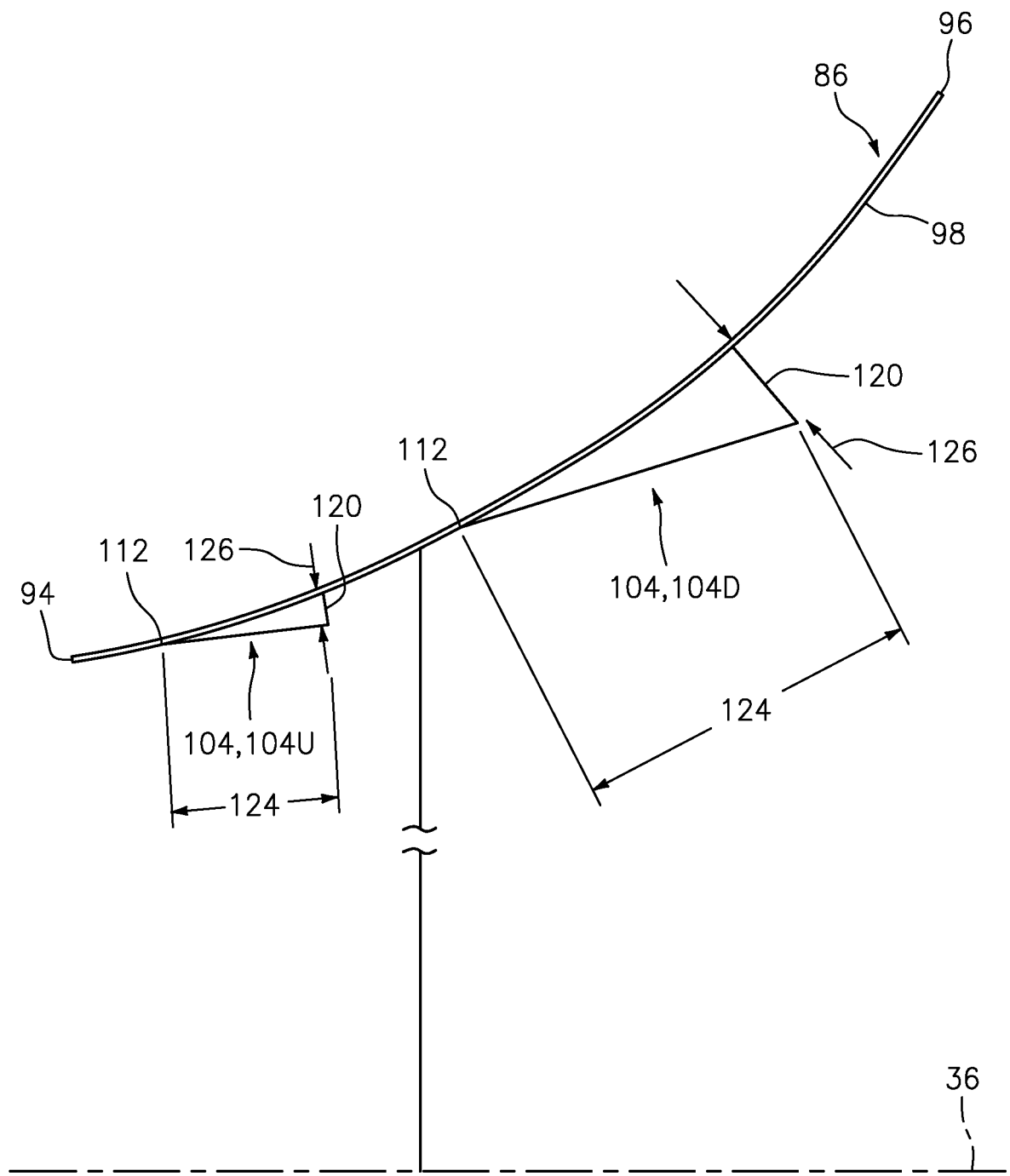
FIG. 10 is a side sectional illustration of the bullnose ramp configured with protrusions arranged in multiple arrays.

In some embodiments, referring to FIG. 10, one or more of the protrusions 104 (e.g., each upstream protrusion 104U) may be axially offset from one or more other of the protrusions 104 (e.g., each downstream protrusion 104D); e.g., the protrusions 104U and 104D may be spaced by a gap. However, each upstream protrusion 104U may (or may not) be laterally (e.g., circumferentially) aligned with a respective closest one of the downstream protrusions 104D. In the specific embodiment of FIG. 10, each of the downstream protrusions 104D also has a different (e.g., larger) size than each of the upstream protrusions 104U. Each downstream protrusion 104D, for example, has a larger longitudinal length 124 and/or a larger vertical height 126 than those of each upstream protrusion 104U.

Figure 19:
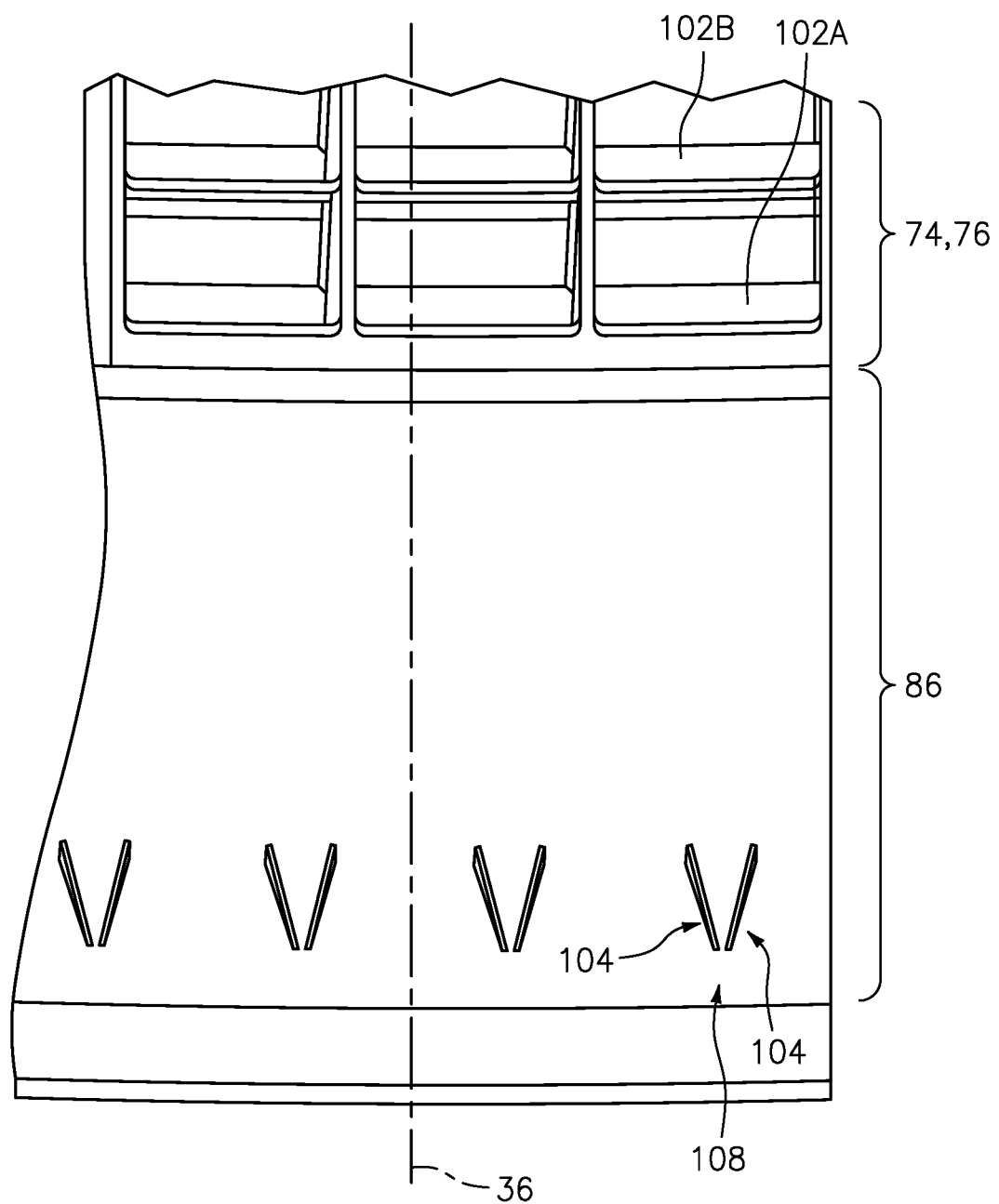
FIG. 19 is a partial illustration of an interface between the bullnose ramp and a cascade structure.
Figure 19B:
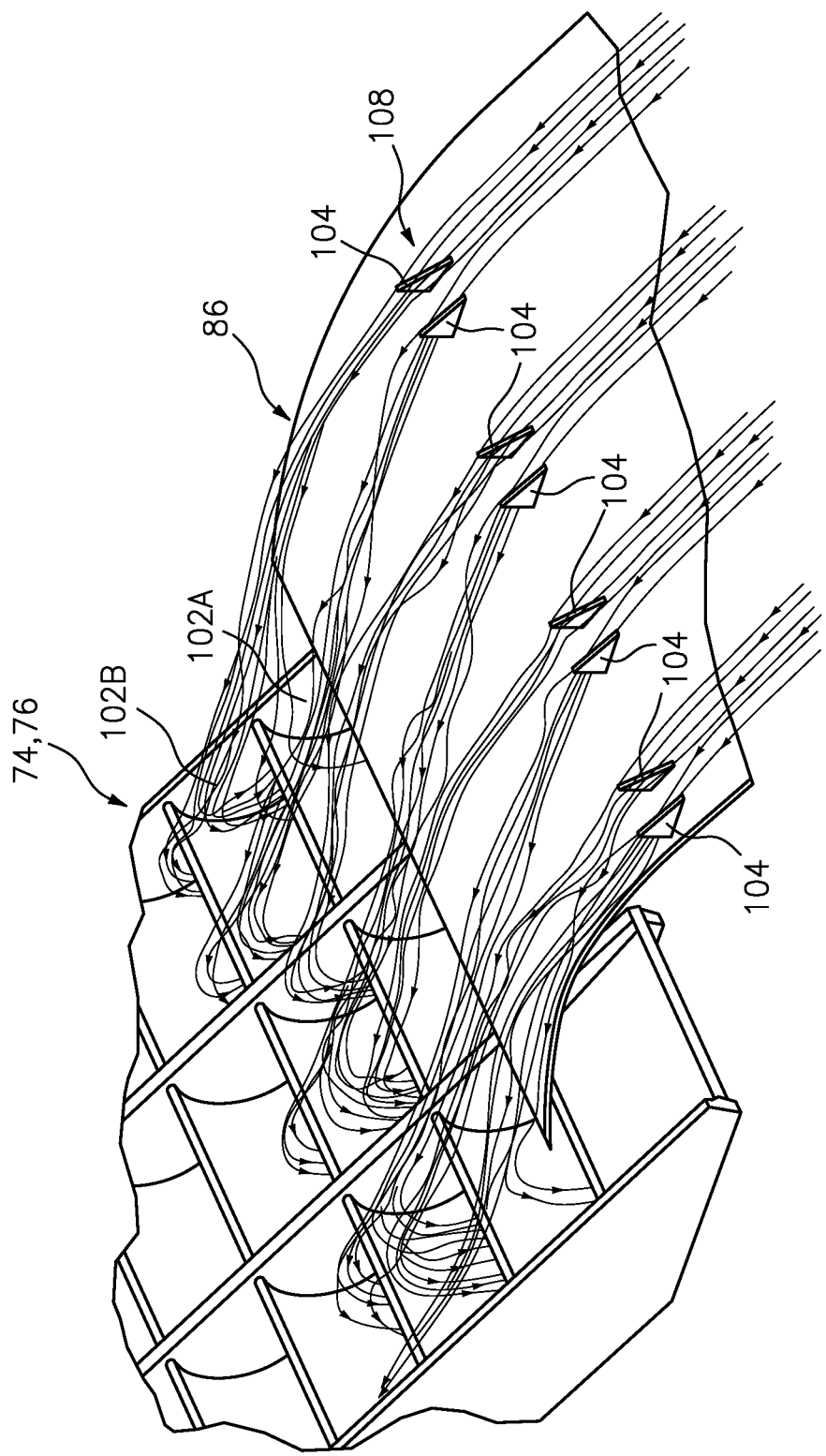
FIG. 19B is a partial illustration of longitudinal vortices that energize boundary layer fluid and delay separation at the interface between the bullnose ramp and the cascade structure.

In some embodiments, referring to FIGS. 19 and 19B, one or more (e.g., each set 108) of the protrusions 104 may be laterally aligned with a respective one of the flow channels (e.g., forward flow channels 102A, 102B) in the cascade structure 74. The present disclosure, however, is not limited to such a relationship.

Figure 20:
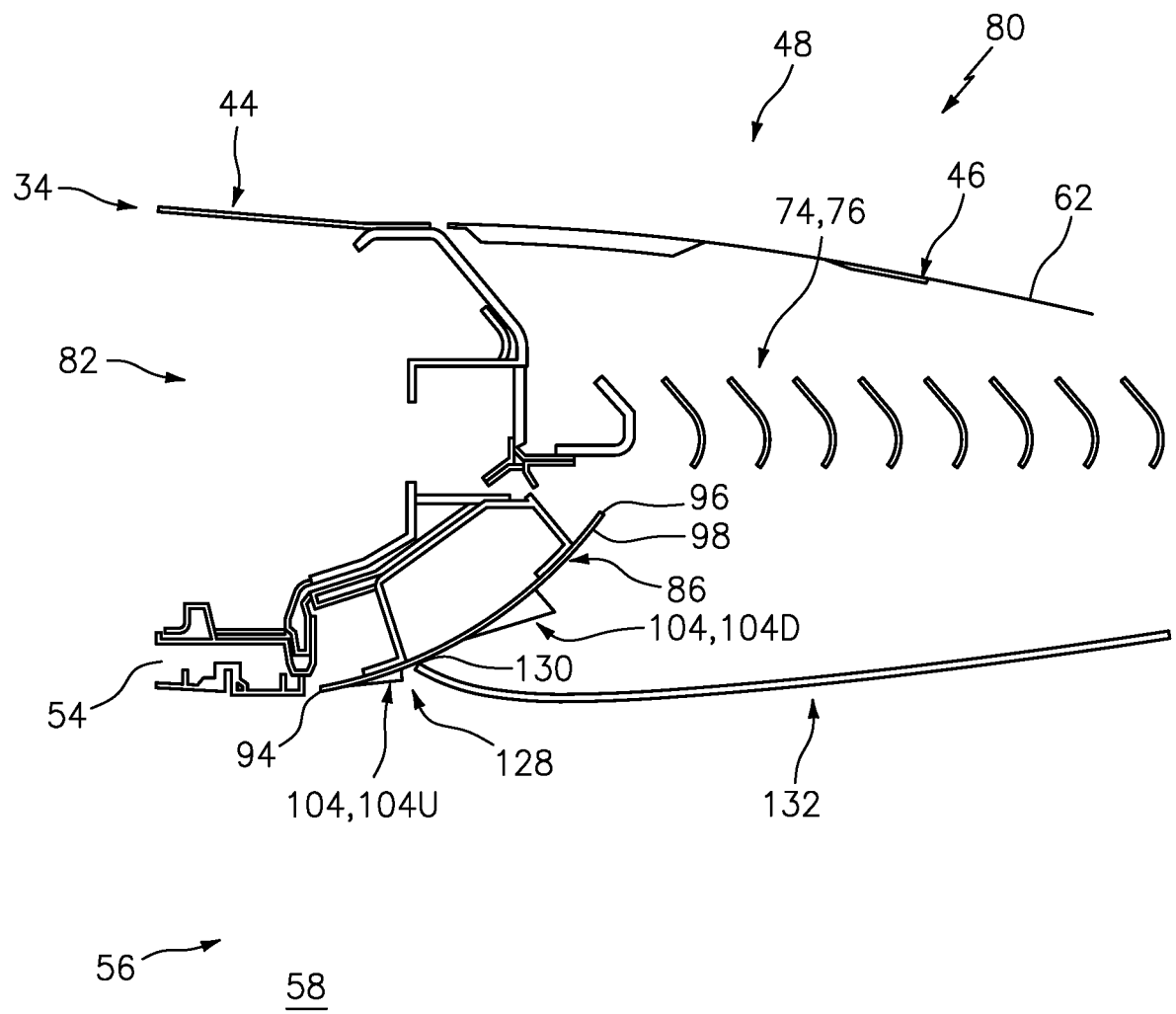
FIG. 20 is a side sectional illustration of a portion of the aircraft propulsion system with its thrust reverser system in the stowed configuration.

In some embodiments, referring to FIG. 20, one or more or each of the protrusions 104 (e.g., each upstream protrusion 104U) may be arranged in a respective channel 128 (also referred to as a "pit"). This channel 128 is formed between an upstream edge 130 of a moveable component 132 of the thrust reverser system 48 (e.g., a respective blocker door 78 or the translating sleeve 62; e.g., see FIG. 3) and the respective bullnose ramp 86 and its surface 98 when the thrust reverser system 48 is in its stowed configuration. With such an arrangement, the upstream protrusions 104U may have little or no negative impact on thrust loss while the propulsion system 30 provide forward thrust. Rather, the upstream protrusions 104U may actually reduce thrust loss that is typically associated with the channel 128 (e.g., "pit").

In some embodiments, one or more or each of the protrusions 104 (e.g., the downstream protrusions 104D) may be arranged outside of the forward thrust duct 56 when the thrust reverser system 48 is in its stowed configuration. The downstream protrusions 104D, for example, may be axially covered/overlapped by and may be radially outboard of the moveable component 132 of the thrust reverser system 48 (e.g., a respective blocker door 78 or the translating sleeve 62; see FIG. 3).

Figure 21A:
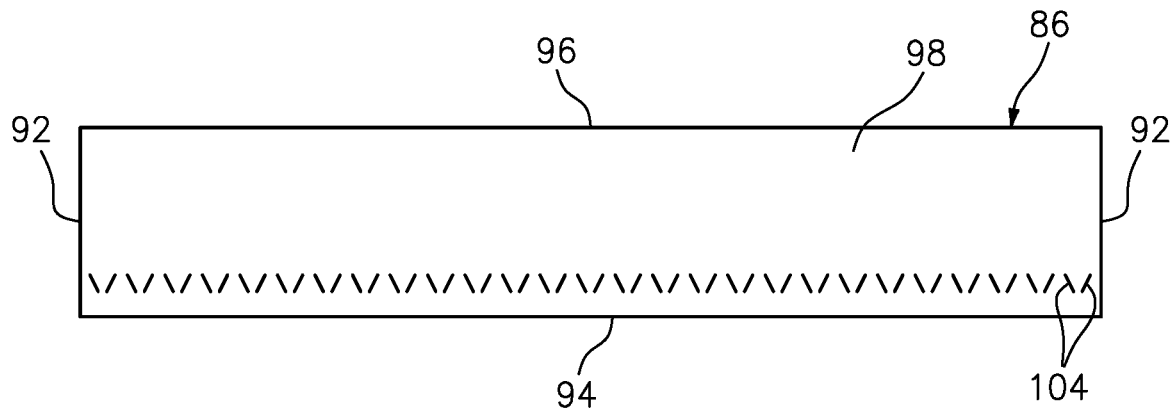
FIGS. 21A and 21B are plan view illustrations of different arrangements of the protrusions along the bullnose ramp.
Figure 21B:
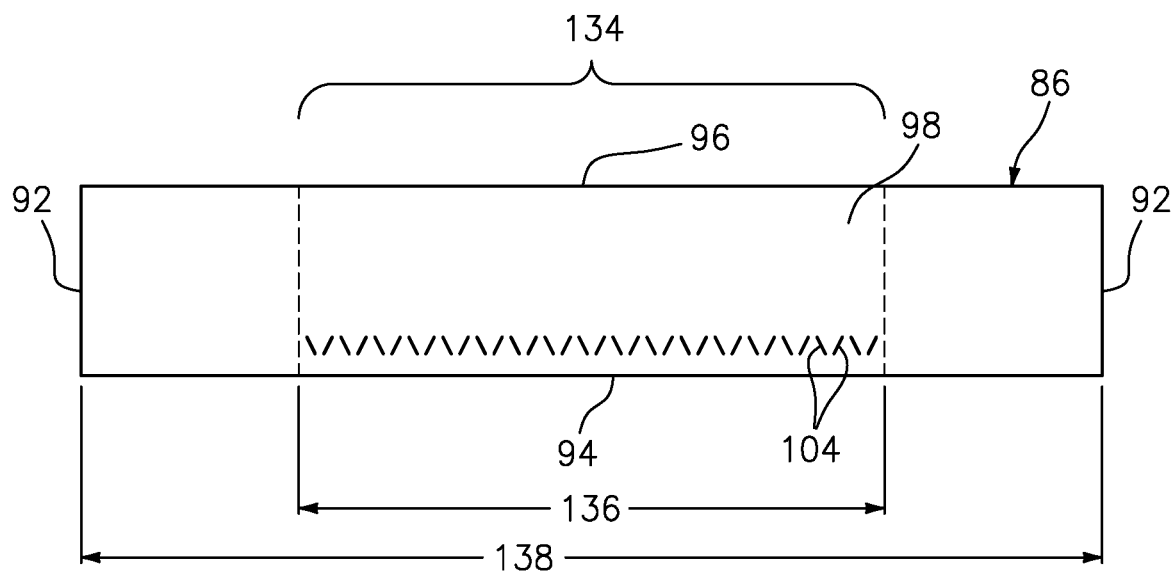

In some embodiments, referring to FIG. 21A, the protrusions 104 may be arranged along substantially (e.g., at least 90-95%) an entire circumferential length of the bullnose ramp 86 and its surface 98. In other embodiments, referring to FIG. 21B, the protrusions 104 may be arranged (e.g., only) along an intermediate region 134 of the circumferential length of the bullnose ramp 86 and its surface 98. This intermediate region 134 is located circumferentially intermediate (e.g., centered) between the bullnose ramp ends 92. A circumferential length 136 of the intermediate region 134 may be between, for example, thirty percent (30%) and ninety percent (90%) of the circumferential length 138 of the bullnose ramp 86 and/or its surface 98; e.g., the length 136 may be between fifty percent (50%) and seventy percent (70%) of the length 138. The present disclosure, however, is not limited to the foregoing exemplary dimensional relationships.

While the propulsion system assembly 80 is described above with respect to a cascade, blocker door type thrust reverser system, the present disclosure is not limited thereto. For example, the bullnose ramp 86 and the associated one or more protrusions 104 (e.g., vortex generators) may alternatively be configured with other types of thrust reverser systems including, but not limited to, cascadeless thrust reverser systems, blocker doorless thrust reverser systems, pivoting door thrust reverser systems, pre-exit thrust reverser systems, etc. In other words, the bullnose ramp 86 and the associated one or more protrusions 104 (e.g., vortex generators) may alternatively be configured with any type of thrust reverser which includes a bullnose ramp type structure to provide a transition from a forward thrust duct to a thrust reverser duct.

In addition to the foregoing, while the gas turbine engine is generally described as a turbofan turbine engine above, the present disclosure is not limited to such an exemplary gas turbine engine configuration. For example, in other embodiments, the gas turbine engine may alternatively be configured as a turbojet gas turbine engine where, for example, the forward thrust duct 56 is configured as a core duct and/or an exhaust duct rather than a bypass duct.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
    a forward thrust duct; and
    a thrust reverser system comprising a thrust reverser duct, a bullnose ramp, a plurality of protrusions and a cascade;
    the bullnose ramp adapted to provide a transition from the forward thrust duct to the thrust reverser duct when the thrust reverser system is in a deployed configuration; and the plurality of protrusions bonded or formed integral with the bullnose ramp, each of the plurality of protrusions adapted to interact with boundary layer fluid flowing along an upstream portion of the bullnose ramp from the forward thrust duct into the thrust reverser duct when the thrust reverser system is in the deployed configuration;

the cascade comprising a plurality of flow channels, a first of the plurality of flow channels circumferentially adjacent a second of the plurality of flow channels;

a first of the plurality of protrusions circumferentially aligned with the first of the plurality of flow channels, a second of the plurality of protrusions is circumferentially aligned with the second of the plurality of flow channels, and the second of the plurality of protrusions is circumferentially adjacent the first of the plurality of protrusions;

a third of the plurality of protrusions circumferentially aligned with the second of the plurality of flow channels, and the third of the plurality of protrusions circumferentially adjacent the second of the plurality of protrusions; and a first circumferential distance between the first of the plurality of protrusions and the second of the plurality of protrusions greater than a second circumferential distance between the second of the plurality of protrusions and the third of the plurality of protrusions, the first circumferential distance decreasing as the first of the plurality of protrusions extends axially towards the first of the plurality of flow channels, and the second circumferential distance increasing as the second of the plurality of protrusions extends axially towards the second of the plurality of flow channels.

2. The assembly of claim 1, wherein at least one of the plurality of protrusions comprises a vortex generator.

3. The assembly of claim 1, wherein at least one of the plurality of protrusions projects out from the bullnose ramp into an inlet to the thrust reverser duct.

4. The assembly of claim 1, wherein a chord line of the first of the plurality of protrusions is parallel with a chord line of the second of the plurality of protrusions.

5. The assembly of claim 1, wherein a chord line of the first of the plurality of protrusions is angularly offset from a chord line of the second of the plurality of protrusions.

6. The assembly of claim 1, wherein at least one of the plurality of protrusions has a planar geometry.

7. The assembly of claim 1, wherein at least one of the plurality of protrusions has a non-planar geometry.

8. The assembly of claim 1, wherein
the first of the plurality of protrusions extends longitudinally from an upstream end to a downstream end; and
a height of the first of the plurality of protrusions at the upstream end is different than the height of the first of the plurality of protrusions at the downstream end.

9. The assembly of claim 1, wherein
the first of the plurality of protrusions extends longitudinally from an upstream end to a downstream end; and
a height of the first of the plurality of protrusions at the upstream end is equal to the height of the first of the plurality of protrusions at the downstream end.

10. The assembly of claim 1, wherein
the bullnose ramp extends circumferentially about an axial centerline; and
the first of the plurality of protrusions is axially aligned with the second of the plurality of protrusions.

11. The assembly of claim 1, wherein
the bullnose ramp extends circumferentially about an axial centerline; and
the first of the plurality of protrusions is axially offset from the second of the plurality of protrusions.

12. The assembly of claim 11, wherein a size of the first of the plurality of protrusions is different than a size of the second of the plurality of protrusions.

13. The assembly of claim 1, wherein the bullnose ramp forms an upstream boundary of an inlet to the thrust reverser duct when the thrust reverser system is in the deployed configuration.

14. The assembly of claim 1, wherein
the bullnose ramp extends circumferentially about an axial centerline; and
the bullnose ramp has a surface with an arcuate sectional geometry when viewed in a plane parallel with the axial centerline.

15. The assembly of claim 1, wherein
the aircraft propulsion system comprises a turbofan aircraft propulsion system; and
the forward thrust duct comprises a bypass duct.

16. The assembly of claim 1, wherein
the thrust reverser system further comprises a moveable component;
a channel is formed by and between the bullnose ramp and an upstream edge of the moveable component when the thrust reverser system is in a stowed configuration; and
at least one of the protrusions is arranged within the channel.

17. The assembly of claim 1, wherein the thrust reverser system further comprises a moveable component; the moveable component axially abuts the bullnose ramp when the thrust reverser system is in a stowed configuration; and at least one of the protrusions is axially overlapped by and radially outboard of the moveable component when the thrust reverser system is in the stowed configuration.

* * * * *